(No Model.)
G. J. FRITZ.
BOTTLE WASHER.
No. 337,054. Patented Mar. 2, 1886.
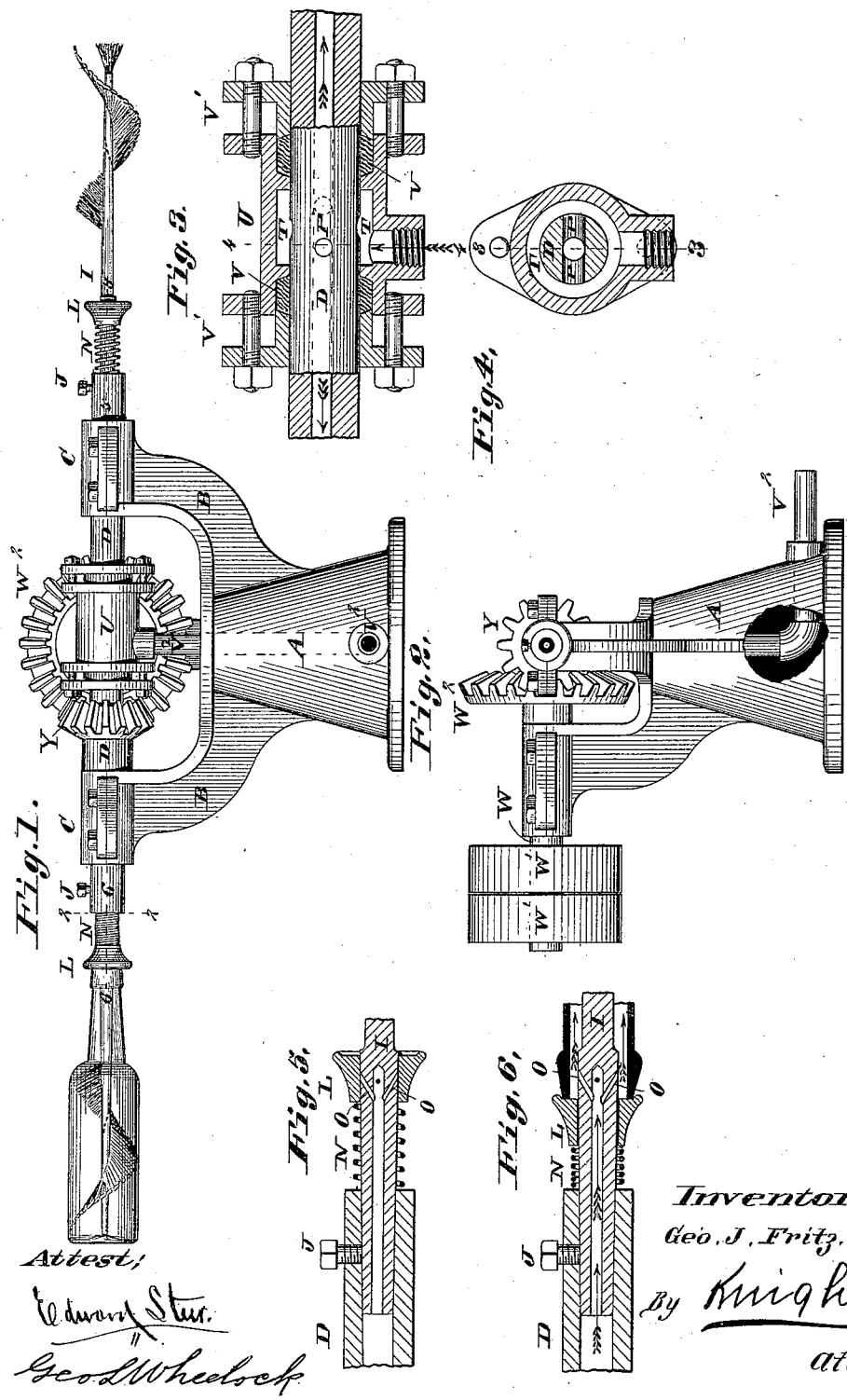
Inventor,
Geo. J. Fritz,
By Knight Bros
Att'ys
Attest:
Edward Stur.
Geo. L. Wheelock

UNITED STATES PATENT OFFICE.

GEORGE J. FRITZ, OF ST. LOUIS, MISSOURI.

BOTTLE-WASHER.

SPECIFICATION forming part of Letters Patent No. 337,054, dated March 2, 1886.

Application filed April 15, 1885. Serial No. 162,370. (No model.)

*To all whom it may concern:*

Be it known that I, GEORGE J. FRITZ, of the city of St. Louis, in the State of Missouri, have invented a certain new and useful Improvement in Bottle-Washers, of which the following is a full, clear, and exact description, reference being had to the accompanying drawings, forming part of this specification, and in which—

Figure 1 is an elevation of my improved washer, showing a bottle on one end. Fig. 2 is a section taken on line 2 2, Fig. 1, part of the stand being broken away. Fig. 3 is an enlarged detail section taken on line 3 3, Fig. 4. Fig. 4 is an enlarged transverse section taken on line 4 4, Fig. 3. Fig. 5 is an enlarged detail section taken on line 5 5, Fig. 1; and Fig. 6 is a similar view taken on line 6 6, Fig. 1.

My invention relates to an improved apparatus for washing bottles; and my invention consists in features of novelty, hereinafter fully described, and pointed out in the claims.

Referring to the drawings, A represents a stand, having arms B, supporting boxes C, in which are journaled the ends of a hollow shaft or sleeve, D, in which are secured the hollow ends of brushes I by set-screws J or other suitable means. On the stems of the brushes are sliding collars or valves L, held outward by springs N when not forced inward by the bottle. (See left side Fig. 1 and Fig. 6.) When the collar is in its outer position, (see Fig. 5 and right side Fig. 1,) it acts as a valve to close openings O, that permit the escape of water, (see arrows, Fig. 6,) when the collar is forced back against the spring by the bottle. (See Fig. 6 and left side Fig. 1.) The water thus escapes through these openings when the bottles are put on the brushes and enters the interior of the bottles, and as soon as the bottles are removed the collars move out and close the openings, shutting off the supply of water.

The water enters the hollow shaft or sleeve through openings P from a chamber, T, surrounding the sleeve, and located in a stuffing-box, U, having packings V and glands V', the packings acting to prevent the escape of water from the chamber along the shaft. The water enters the chamber through a supply-pipe, V², that preferably passes through the stand, as shown.

As a means for turning the shaft, I have shown a drive-shaft, W, provided with tight and loose pulleys W', and with a bevel cog-wheel, W², that meshes into a pinion, Y, on the sleeve. One brush only could be used, and the other end of the sleeve stopped up.

I claim as my invention—

1. In a bottle-washer, the combination of the sleeve or hollow shaft having holes for the inlet of water, hollow perforated brushes secured in said sleeve, the perforations being controlled by automatic valves, stuffing-box surrounding the sleeve and provided with a water-chamber, and a supply-pipe, substantially as set forth.

2. In a bottle-washer, the combination of the stand, sleeve, or hollow shaft journaled to arms of the stand and having perforations for the inlet of water, hollow perforated brushes secured to the sleeve, collar-valves on the brush-stems for controlling water-outlet openings, springs for moving the valves, described gearing for turning the sleeve, stuffing-box on the sleeve provided with a water-chamber, and supply-pipe passing through the stand and connecting with the box, substantially as set forth.

GEO. J. FRITZ.

In presence of—
GEO. H. KNIGHT,
SAML. KNIGHT.